Nov. 15, 1938. A. A. FLYNN 2,136,814
BATTERY CONNECTER
Filed Oct. 15, 1937
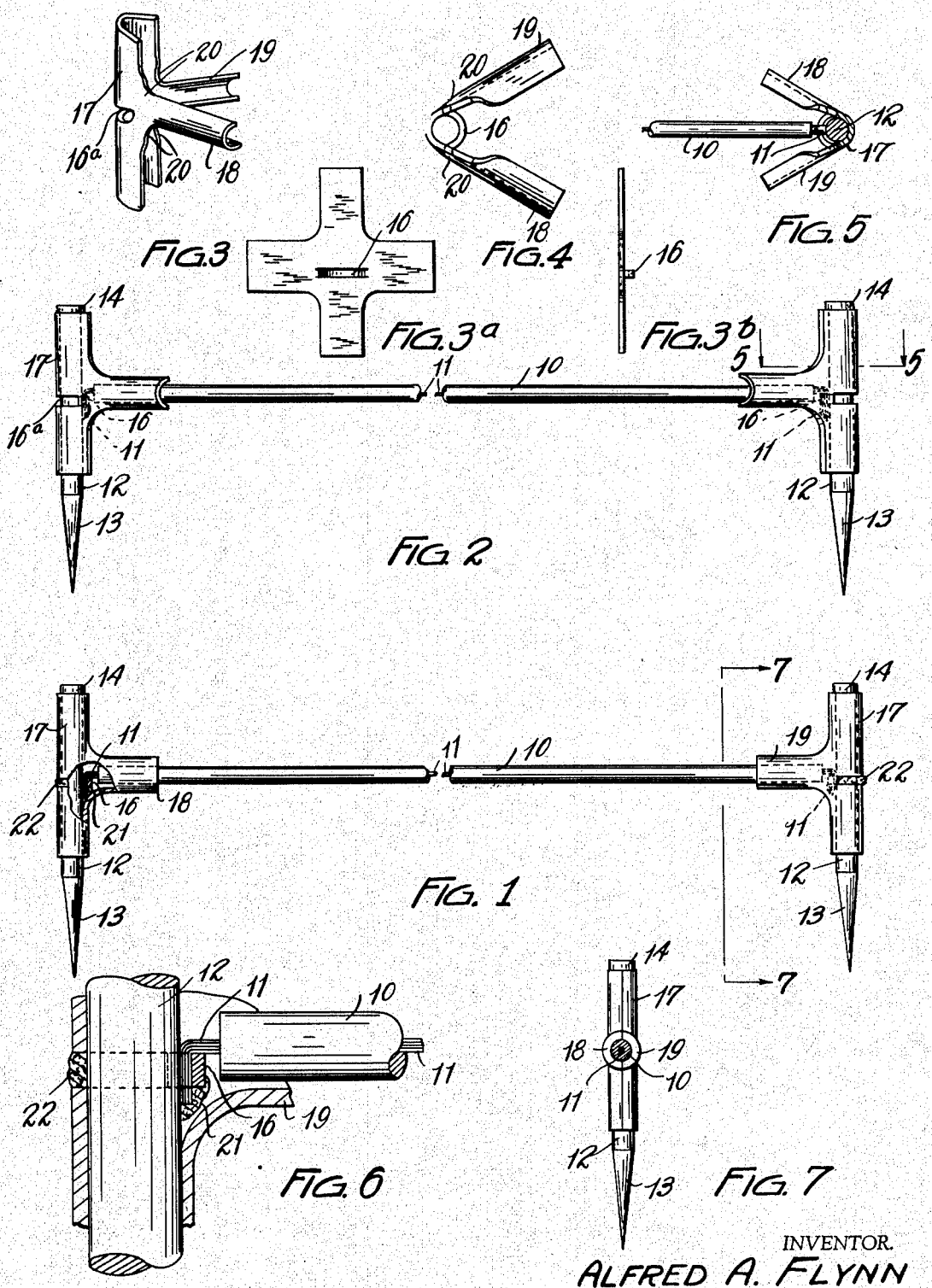
INVENTOR.
ALFRED A. FLYNN
BY Kwis Hudson & Kent
ATTORNEYS Patented Nov. 15, 1938

2,136,814

UNITED STATES PATENT OFFICE 2,136,814

BATTERY CONNECTER

Alfred A. Flynn, Cleveland Heights, Ohio, assignor to Mueller Electric Company, Cleveland, Ohio, a partnership composed of Ralph S. Mueller, Maude K. Mueller, Virginia de Coningh, and Scott Mueller Application October 15, 1937, Serial No. 169,159

2 Claims. (Cl. 173—324)

This invention relates to electrical connecters, and particularly to connecters for connecting storage batteries when the latter are being charged, although, of course, connecters of this character may be advantageously used for other purposes.

Heretofore electrical connecters of the general type referred to herein have been used for connecting storage batteries which are being charged. These connecters have comprised lengths of insulated electrically conductive cable, the opposite ends of which have been electrically connected to hard sharpened pins partially embedded in metal housings as, for example, lead molded or cast around the pins, with the sharpened ends thereof projecting from the housings. The molded or cast metal housings for the pins enclosed the connections between the opposite ends of the length of cable and the pins to prevent acid from the batteries accumulating thereon. It has been customary to provide the metal housings for the pins with enlarged head or anvil-like portions which can be struck by a hammer or other tool when the connecters are applied to batteries to drive the pins into the lead posts of the batteries. Inasmuch as the metal housings usually are of lead, the continued application of blows thereto quickly results in a deformation of the housings and also has a tendency to loosen the anchorage of the pins in the housings.

An object of the present invention is to provide connecters for connecting storage batteries and the like, which may be economically manufactured, in that the housings for the sharpened pins of the connecters are formed of sheet metal stampings.

Another object is to provide connecters for connecting storage batteries and which in use are of long life and easily applied to and removed from the battery posts.

A further object is to provide connecters of the type referred to, wherein the hard sharpened pins thereof which are driven into the battery posts are so housed in metal housings as to protect the connections between the ends of the electrically conductive cable and the pins from acid corrosion, but to allow the blows for driving the pins into the battery posts to be applied directly to the heads of the pins, wherefore the housings are not deformed by use and the anchorage of the pins in the housings is not loosened.

A still further object is to provide connecters of the type referred to, wherein the housings for the hardened pins are provided with integral eyes or rings through which the pins extend and into which the bared opposite ends of the cables are inserted and secured to the hardened pins, thus making a good electrical contact between the pins and the cables.

Further and additional objects and advantages not hereinbefore referred to will become apparent hereinafter during the following detailed description of an embodiment of the invention which is illustrated in the accompanying drawing, wherein Fig. 1 is an enlarged elevational view of a connecter with a portion of one of the pin housings broken away and shown in section.

Fig. 2 is an enlarged elevational view of the connecter similar to Fig. 1 but illustrates the housings for the pin before they have been finally positioned on the pins.

Fig. 3 is a perspective detailed view of one of the pin housings prior to the application of the housing to the pin and prior to the housing being pressed to final or clamping position upon the pin.

Fig. 3a is a front elevational view of a housing after it has been blanked out and before it has been formed into the shape shown in Fig. 3.

Fig. 3b is a side elevational view of the housing blank shown in Fig. 3a.

Fig. 4 is a top plan view of the housing shown in Fig. 3.

Fig. 5 is a sectional view on a reduced scale taken substantially on line 5—5 of Fig. 2, looking in the direction of the arrows.

Fig. 6 is a fragmentary enlarged sectional and elevational view and corresponds substantially to the portion of Fig. 1 which is broken away and shown in section, and Fig. 7 is a sectional and elevational view taken substantially on line 7—7 of Fig. 1 looking in the direction of the arrows.

The connecter of the present invention comprises the usual insulated electrically conductive cable or wire 10, the opposite ends of which are bared to provide lengths of uninsulated wire, as indicated at 11, which lengths of uninsulated wire are adapted to be connected with a good electrical connection to the pins of the connecter which are driven during the use of the latter into the battery posts of the storage batteries being connected. The pins of the present connecter are indicated at 12 and preferably are formed of hardened steel lead-coated by any suitable means and have at one end sharpened or tapered points 13 and at their opposite ends enlarged heads 14 which can be given blows by a hammer or other tool for driving the pointed ends 13 of the pins into the lead battery posts. The uninsulated ends 11 of the cable or wire 10 are electrically connected to the pins 12 intermediate the pointed ends 13 thereof and the heads 14 as will later be explained. In order to protect the pins, and particularly the connections between the same and the ends 11 of the cable from acid corrosion and to facilitate the handling of the connecter, housings now to be described are provided for the pins. As already stated, it has been customary in connecters of this type to provide housings for the pins but these housings have been in the form of masses of metal molded or cast about the upper ends of the pins and such housings have received the blows for driving the pins into the lead battery posts. It is proposed in the present invention to form the housings for the pins from sheet metal stampings and to so construct the housings and mount the same on the pins as to leave the heads of the latter exposed so that the blows for driving the pins into the battery posts can be directly imparted to the pins thus avoiding deformation of the soft housings and loosening of the pins.

The housings are blanked out from sheet metal in cruciform configuration as shown in Figs. 3a and 3b. These housings are preferably made of sheet metal such as steel that is suitably lead-coated. In blanking out the housings strips are punched or severed from the housings along two sides of the strips, as indicated at 16 in Figs. 3a and 3b. The cruciform blanks are bent along their vertical center lines, as viewed in Fig. 3a, into trough-like form to provide a pin receiving portion 17, from the edges of which intermediate the ends of said portion divergently project the horizontal (as viewed in Fig. 3a) arms of the blanks which also are pressed into trough-like form and which constitute cable enclosing arms 18 and 19. The blanks adjacent the intersection of the arms with the portion 17 are crimped or bent inwardly, as indicated at 20, and above and below the strip 16 to form portions of reduced width in the pin receiving part 17 of the housings.

Forming the housing blanks into the shape just described and as illustrated in Fig. 3 causes the punched out or severed strips 16 to assume an arcuate shape as shown in Fig. 4. The hardened steel pins 12 are positioned in the pin receiving part 17 of the housings and pass through what might be termed the eyelets formed by the strips 16, the heads 14 of the pins being located above the upper ends of the housings with their undersides in engagement with the upper edges of the part 17 of the housings while the pins above and below the strips 16 are gripped by the portions 20. The uninsulated bared ends 11 of the cable 10 are passed between the strips 16 and the pins 12 and solder is applied to the bared ends 11 and to the pins as indicated at 21 in Figs. 1 and 6 to form a good electrical connection. The pin receiving parts 17 of the housings are then pressed or clamped around the pins with the off-set portions 20 tightly gripping the pins above and below the point where the cable is connected thereto. The arms 18 and 19 of the housings are pressed toward each other and brought into tight surrounding relationship with respect to the insulated ends of the cable, as clearly shown in Fig. 1. When the housings have thus been mounted upon the pins and clamped in position thereon and on the ends of the cable 10 solder may be applied in the openings 16a formed in the housings when the strips 16 were punched or severed therefrom, such solder being indicated at 22 in Figs. 1 and 6 and acting as a further protection against the corrosion of the connections between the cable and the pins due to acid fumes from the battery getting thereon.

It will be seen that a connecter constructed in accordance with the present invention provides housings for the pins which can be economically produced from sheet metal stampings and which fully protect the pins and the connections between the same and the ends of the cable and which facilitate the handling of the connecter. Furthermore, the heads of the pins are exposed above the upper ends of the housings, wherefore the necessary blows to drive the pins into the lead battery posts can be imparted directly to the hardened pins and not to the housings. In addition it is not necessary to employ extra parts in the form of separate bushings or sleeves mounted on the pins for connecting the ends of the cable to the pins, since the strips 16 integral with the housings and through which the pins and the bared ends of the cable extend serve the purpose of the separate bushings or sleeves heretofore employed in connecters of this general type.

Although a perferred embodiment of the invention has been illustrated and described herein, it will be understood that the invention is susceptible of various modifications and adaptations within the scope of the appended claims.

Having thus described my invention I claim:

1. A device for connecting a conductor to a lead terminal comprising a pin provided with a sharpened end adapted to be driven into the terminal and a housing for said pin and for an end of the conductor and comprising a sheet metal stamping having a trough-shaped portion receiving said pin with the sharpened end thereof projecting therefrom, and trough-like arms projecting angularly from said portion intermediate the ends thereof, said portion being provided with an integral punched out strip extending transversely of the portion adjacent to the junction of said arms therewith and forming an eyelet through which said pin extends and adapted to have the bared end of said conductor pass through it between said strip and said pin, said portion in use being clamped around said pin and said arms being adapted to be clamped around the end of said conductor.

2. A device for connecting a conductor to a lead terminal comprising a pin provided at one of its ends with a sharpened point and at its opposite end with an enlarged head adapted to receive hammer blows for driving the pin into the terminal, and a housing for said pin comprising a sheet metal stamping having a trough-shaped portion receiving said pin with the sharpened end thereof projecting from one end of said portion and the head thereof located exteriorly of the other end thereof, and trough-like arms projecting angularly from said portion intermediate the ends thereof, said portion being provided adjacent the junction of said arms with a punched out integral transversely extending strip forming an eyelet through which said pin extends and adapted to have the bared end of said conductor passed through said eyelet and electrically connected with said pin, said portion being clamped around said pin and said arms being adapted to be clamped around the end of said conductor.

ALFRED A. FLYNN.